July 1, 1930.  H. C. HARRIS  1,768,759
UNIVERSAL JOINT
Filed Jan. 14, 1928

Inventor
Howard C. Harris
By Kivis Hudson Kent
Attorneys

Patented July 1, 1930

1,768,759

UNITED STATES PATENT OFFICE

HOWARD C. HARRIS, OF AKRON, OHIO

UNIVERSAL JOINT

Application filed January 14, 1928. Serial No. 246,735.

This invention relates to universal joints and more particularly to universal joints for use in automobiles, although the principles of the invention are applicable to universal joints for use in other apparatus.

It is one of the objects of the invention to provide a universal joint that will be comparatively inexpensive to manufacture, capable of transmitting the loads to which it is subjected and which will be devoid of relatively moving contacting metal surfaces so as to not require lubrication.

A further object of the invention is to provide a universal joint that will be capable of cushioning shocks and avoid their transmission from one of the shaft members to the other.

A further object of the invention is to provide a universal joint of comparatively simple design that may be readily disassembled and reassembled, when necessary.

Other objects of the invention and the features of novelty will be apparent from the following description taken in connection with the accompanying drawings, of which—

Figure 1:
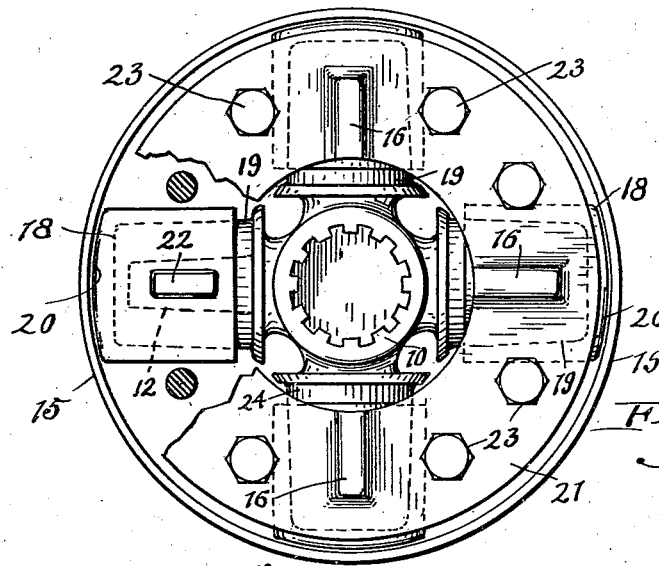
Fig. 1 is an end elevation of a universal joint embodying my invention, certain parts being broken and other parts shown in section.
Figure 2:
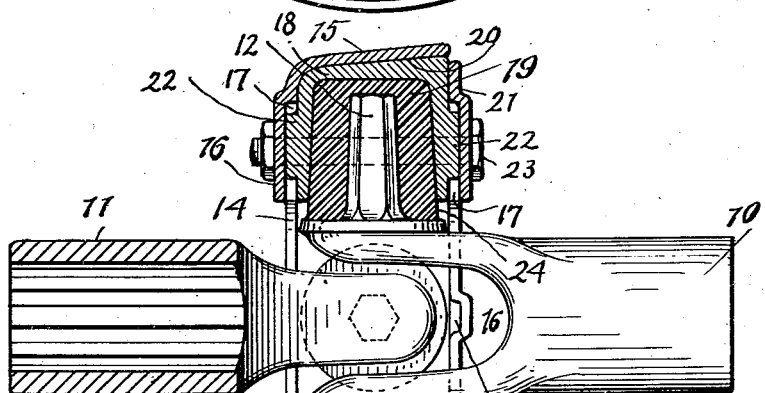
Fig. 2 is a longitudinal section through the universal joint with one of the shaft members shown in elevation.

Referring to Figs. 1 and 2, 10 and 11 indicate the shaft members which may be in the form of internally splined tubes, bifurcated at one end and provided with oppositely projecting trunnions 12 and 13. The trunnions 12 and 13 are preferably of tapered form and polygonal cross section and, in the drawings, I have shown them as hexagonal in cross section. A circumferentially extending member 14, preferably pressed from sheet metal, has a conical flange 15 extending axially of the shaft members and is also provided with radially extending depressions 16, adjacent each of the trunnions, which provide radial slots 17 for a purpose to be hereinafter described. Socket members 18 are associated with each of the trunnions 12 and 13, of the two shafts, and flexible bushings 19, preferably of rubber, are arranged between each of said socket members and its associated trunnion.

Each of the socket members 18 has a beveled circumferentially extending surface 20 which cooperates with the interior of the conical flange 15. A ring 21 fits against the sides of the socket members 18 and is also provided with radially extending depressions 16 to form slots 17 and each of the socket members has lugs 22 which fit the radial slots 17, for the purpose of forming an interlocking connection between the socket members and the members 14 and 21 to transmit the torsional stresses therebetween. The sides of the socket members 18, which carry the lugs 22, are preferably flat so as to have a good bearing on the members 14 and 21 that will hold the socket members against turning with respect to these members 14 and 21.

Bolts 23 extending in the direction of the axes of the shaft members 10 and 11 connect the members 14 and 21 and I prefer to have these bolts arranged in pairs on opposite sides of the socket members 18, as shown in Fig. 1. By tightening the bolts 23 the socket members 18 are clamped between the members 14 and 21 and, as the members 14 and 21 are drawn together, the cooperation of the beveled surfaces 20 with the conical flange 15 causes the socket members 18 to be moved axially of the trunnions 12 and 13 to thereby compress the bushings 19. Such compression of the bushings 19 causes the rubber to flow axially of the trunnions and also causes the bushings to engage the socket members, as well as the trunnions, with sufficient force to normally prevent the bushings from turning either in the socket members or on the trunnions so that the relative angular movements of the shaft members 10 and 11 will be accommodated by the torsional flexing of the bushings. In this connection it should be observed that there should be a substantial clearance between the inner ends of the socket members 18 and the shaft members, at the point 24, to provide an exposed rubber surface that will be sufficient to accommodate the relative angular movements of the adjacent metal parts, without chafing of the rubber at these points.

Figure 3:
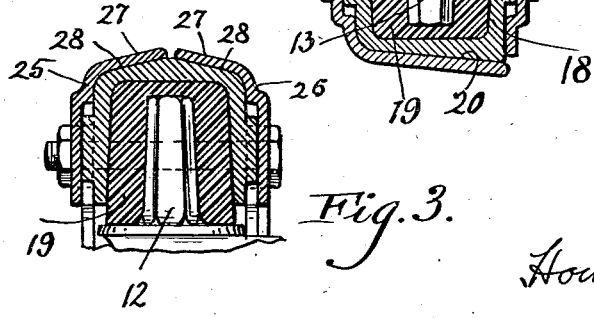
Fig. 3 is a detail section illustrating a slight modification of the construction illustrated in Figs. 1 and 2.

In the form illustrated in Fig. 3 there are two similar circumferentially extending members 25 and 26 which are reversely arranged and which have conical flanges 27 to cooperate with oppositely beveled surfaces 28 on the socket members. In other respects the construction conforms to that illustrated in Figs. 1 and 2.

From the foregoing it will be seen that I have provided a universal joint in which all contacting metal parts are rigidly secured together and the relative angular movements of the shaft members are accommodated by the torsional flexing of the rubber bushings which require no lubrication and have the further advantage that these bushings absorb shocks which would be transmitted by contacting metal parts.

While I have illustrated and described what I now consider to be the preferred form of my invention, it is understood that various changes may be made in the details of the constructions illustrated and described, without departing from the spirit of the invention as it is defined in the appended claims.

Having thus described my invention, I claim:

1. In a universal joint, a pair of shaft members each having oppositely projecting trunnions, flexible bushings surrounding said trunnions, socket members for said bushings, circumferentially extending means connecting said socket members, and means for moving said socket members radially to compress said bushings axially of said trunnions.

2. In a universal joint, a pair of shaft members each having oppositely projecting trunnions, and means connecting said members comprising flexible bushings on said trunnions and radially movable socket members in which said bushings are received, and means whereby said bushings are prevented from slipping on said trunnions and in said socket members.

3. In a universal joint, a pair of shaft members each having oppositely projecting trunnions, and means connecting said members comprising flexible bushings on said trunnions and sockets in which said bushings are received, and means for moving said sockets axially of said trunnions to compress said bushings.

4. In a universal joint, a pair of shaft members each having oppositely projecting trunnions, circumferentially extending means surrounding said trunnions and including relatively movable socket members coaxial with the respective trunnions, a rubber bushing fitting each of said socket members and the trunnion associated therewith and normally held against turning in the socket member or on the trunnion, whereby the changes in the angular relation of the axes of said shaft members are accommodated by torsional flexing of said bushing.

5. In a universal joint, a pair of shaft members each having oppositely projecting trunnions, circumferentially extending means surrounding said trunnions and including sockets coaxial with each trunnion, a rubber bushing fitting each of said sockets and the trunnion associated therewith and normally held against turning in the socket or on the trunnion, and means for compressing said bushings axially of said trunnions.

6. In a universal joint, a pair of shaft members each having oppositely projecting trunnions, a circumferentially extending member surrounding said trunnions, socket members carried by said circumferentially extending member and arranged coaxially with each of said trunnions, a rubber bushing between each of said socket members and fitting the trunnion associated therewith, means for securing said socket members to said circumferentially extending member and cooperating means on said circumferentially extending member and each of said socket members for moving each of said socket members axially of its associated trunnions for the purpose of compressing said bushings.

7. In a universal joint, a pair of shaft members each having oppositely projecting trunnions, a circumferentially extending member surrounding said trunnions and having a conical flange extending axially of said shaft members, a socket member associated with each of said trunnions and each having a beveled surface cooperating with said flange, a rubber bushing arranged between each socket member and its associated trunnion, and means for clamping said socket member to said circumferentially extending member and whereby the socket members are moved axially of the trunnions to compress said bushings.

8. In a universal joint, a pair of shaft members each having oppositely projecting trunnions, a pair of circumferentially extending members surrounding said trunnions and each having a conical flange extending axially of said shaft members, socket members carried by said circumferentially extending members and each associated with one of said trunnions and having beveled surfaces fitting said flanges, a rubber bushing arranged in each of said socket members and fitting the trunnion associated therewith, and bolts extending axially of said shaft members and drawing said circumferentially extending members together for the purpose of securing said socket members.

9. In a universal joint, a pair of shaft members each having oppositely projecting trunnions, a pair of circumferentially extending members for transmitting torsional stresses from one of said shaft members to the other and each having a radially extending slot adjacent each of said trunnions, socket members associated with each of said trunnions and engaging the adjacent slots in said circumferentially extending members, rubber bushings arranged between each socket member and its associated trunnion, and means for clamping said circumferentially extending members together to secure said socket members.

10. In a universal joint, a pair of shaft members each having oppositely projecting trunnions, a pair of circumferentially extending members for transmitting torsional stresses from one of said shaft members to the other and each having a radially extending slot adjacent each of said trunnions, socket members associated with each of said trunnions and engaging the adjacent slots in said circumferentially extending members, rubber bushings arranged between each socket member and its associated trunnion, means for clamping said circumferentially extending members together to secure said socket members, said socket members and one of said circumferentially extending members having cooperating means whereby the socket members are moved radially of their associated trunnions for the purpose of compressing said bushings.

11. In a universal joint, a pair of shaft members each having oppositely projecting trunnions, a pair of circumferentially extending members for transmitting torsional stresses from one of said shaft members to the other and each having a radially extending slot adjacent each of said trunnions, socket members associated with each of said trunnions and engaging the adjacent slots in said circumferentially extending members, rubber bushings arranged between each socket member and its associated trunnion, means for clamping said circumferentially extending members together to secure said socket members, said socket members and both of said circumferentially extending members having cooperating means whereby the socket members are moved radially of their associated trunnions for the purpose of compressing said bushings.

12. In a universal joint, a pair of shaft members each having oppositely projecting trunnions, a pressed metal member surrounding said trunnions and having a conical flange extending axially of said shaft members, a socket member surrounding each of said trunnions and having a beveled surface to cooperate with said flange, a rubber bushing between each socket member and its associated trunnion, and means for securing said socket members to said pressed metal member and whereby the engagement of said beveled surfaces with said flange move the socket members axially of their associated trunnions to compress said bushings.

In testimony whereof, I hereunto affix my signature.

HOWARD C. HARRIS.